(12) United States Patent
Pan et al.

(10) Patent No.: US 12,372,414 B2
(45) Date of Patent: Jul. 29, 2025

(54) DEVICE AND METHOD FOR PHASE IMAGING AND ELEMENT DETECTION BASED ON WAVEFRONT MODULATION

(71) Applicant: Shanghai Institute of Optics And Fine Mechanics, Chinese Academy of Sciences, Shanghai (CN)

(72) Inventors: Xingchen Pan, Shanghai (CN); Cheng Liu, Shanghai (CN); Jianqiang Zhu, Shanghai (CN)

(73) Assignee: Shanghai Institute of Optics And Fine Mechanics, Chinese Academy of Sciences, Shanghai (CN)

( * ) Notice: Subject to any disclaimer, the term of this patent is extended or adjusted under 35 U.S.C. 154(b) by 458 days.

(21) Appl. No.: 17/875,392

(22) Filed: Jul. 27, 2022

(65) Prior Publication Data

US 2022/0381619 A1 Dec. 1, 2022

Related U.S. Application Data

(63) Continuation of application No. PCT/CN2021/070200, filed on Jan. 5, 2021.

(30) Foreign Application Priority Data

Dec. 11, 2020 (CN) .......................... 202011459692.8

(51) Int. Cl.
*G01J 9/00* (2006.01)
*G02B 6/28* (2006.01)
(Continued)

(52) U.S. Cl.
CPC .................. *G01J 9/00* (2013.01); *G02B 6/28* (2013.01); *G02B 27/09* (2013.01); *G02B 27/126* (2013.01);
(Continued)

(58) Field of Classification Search
CPC ... G01J 9/00; G01J 9/02; G01N 21/01; G01N 21/39; G02B 27/09; G02B 27/126;
(Continued)

(56) References Cited

U.S. PATENT DOCUMENTS

2005/0007603 A1* 1/2005 Arieli ........................ G01J 9/02
356/601
2012/0182591 A1 7/2012 Masumura
(Continued)

FOREIGN PATENT DOCUMENTS

| CN | 110376135 A | 10/2019 |
| CN | 111208089 A | 5/2020 |
| JP | 2006153573 A | 6/2006 |

*Primary Examiner* — Catherine T. Rastovski
*Assistant Examiner* — Brian Butler Geiss
(74) *Attorney, Agent, or Firm* — Mei & Mark LLP; Manni Li

(57) ABSTRACT

A device and method for phase imaging and element detection based on wavefront modulation are provided to overcome the disadvantages of an existing interferometry such as twin image elimination, limit resolution, under-sampling wavefront measurement, and multi-modal measurement. From the perspective of light field encoding, the accurate measurement to a complex amplitude of a light field to be measured is completely achieved by the iterative calculation, and at the same time, a twin image problem may be effectively eliminated, and it has the multi-modal (multi-wavelength) reconstruction ability. Theoretically, it is able to reach the diffraction limit resolution, may be widely used in phase imaging, optical element surface-type detection, polarization distribution measurement and the like, and it has a wide range of applications.

6 Claims, 5 Drawing Sheets

(51) Int. Cl.
| | |
|---|---|
| *G02B 27/09* | (2006.01) |
| *G02B 27/12* | (2006.01) |
| *G02B 27/14* | (2006.01) |
| *G02B 27/28* | (2006.01) |
| *H04N 23/56* | (2023.01) |
| *H04N 23/71* | (2023.01) |
| *H04N 23/74* | (2023.01) |

(52) U.S. Cl.
CPC ............ *G02B 27/14* (2013.01); *G02B 27/286* (2013.01); *H04N 23/56* (2023.01); *H04N 23/71* (2023.01); *H04N 23/74* (2023.01)

(58) Field of Classification Search
CPC ........ G02B 27/14; G02B 27/286; G02B 6/28; H04N 23/74; H04N 23/71; H04N 23/95
See application file for complete search history.

(56) References Cited

U.S. PATENT DOCUMENTS

| | | |
|---|---|---|
| 2015/0002844 A1 | 1/2015 | Park et al. |
| 2021/0311368 A1 | 10/2021 | Iguchi |

* cited by examiner

# DEVICE AND METHOD FOR PHASE IMAGING AND ELEMENT DETECTION BASED ON WAVEFRONT MODULATION

CROSS-REFERENCE TO RELATED APPLICATIONS

The subject application is a continuation of PCT/CN2021/070200 filed on Jan. 5, 2021, which in turn claims priority to Chinese patent application CN202011459692.8 filed on Dec. 11, 2020 in China. The contents and subject matters of the PCT international stage application and Chinese priority application are incorporated herein by reference.

TECHNICAL FIELD

The present invention relates to wavefront phase recovery, wavefront detection, and imaging, in particular to a device and method for phase imaging and element detection based on wavefront modulation.

BACKGROUND ART

In order to obtain complete information of wavefront distribution, not only amplitude distribution needs to be obtained, but also complete phase information is required. However, unlike intensity information, the wavefront phase information may not be directly measured by a detector but may only be achieved by a method of indirect measurement. Interferometry and digital holography are extremely important phase measuring and imaging technologies and widely used in the fields of material chemistry, biomedicine, precision detection, and manufacturing etc., but the elimination of the twin image is the key problem faced by the interferometry technology. At present, a commercially available interferometer usually adopts a four-step phase shifting method to eliminate the twin image, but the method is complicated in structure and requires a precise phase shifting system. With the increase of a measurement aperture, the cost is increased exponentially, and the core technology is monopolized by foreign countries. At the same time, the main source of data of the interferometry is an interference fringe, so the conventional interferometry must meet sampling requirements. While a sampling interval is too large, it may be difficult to achieve the phase measurement. In addition, a phase recovery technology may also achieve the phase measurement. It uses the recorded intensity information to reconstruct the phase information through iterative calculation. Theoretically, it may reach or even exceed a diffraction limit resolution and has the undersampled phase recovery, and multi-modal phase recovery capability, which is incomparable to the interferometry. Since reference light is not required, it is theoretically a phase measurement technology superior to the interferometry, but because a convergence requirement thereof is relatively high, a multi-amplitude diffraction light spot or a strict constraint condition is usually required. Although it may be widely used in the fields of X-ray and electron beam imaging, the practical advantages in a visible light waveband are not apparent. Therefore, the development of a phase detection and imaging technology that is strong in applicability and rapid in calculation speed, may reach the diffraction limit resolution theoretically and achieve the undersampled phase measurement, and has the multi-modal measurement capability without the twin image problem is an urgent need in the basic research and industrial application fields.

SUMMARY OF THE INVENTION

To solve the problems of the existing interferometry in twin image elimination, limit resolution, undersampled wavefront measurement, multi-modal measurement etc., the present invention provides a device and method for phase imaging and element detection based on wavefront modulation. From the perspective of a light field encoding, the accurate measurement of the complex amplitude of the light field to be tested is completely achieved through iterative calculation, and a twin image problem may be effectively eliminated at the same time. It has the multi-modal (multi-wavelength) reconstruction capability, may achieve the diffraction limit resolution theoretically, may be widely used in phase imaging, optical element surface-type detection, polarization distribution measurement etc., and has a wide range of applications.

The present invention provides a phase imaging device based on wavefront modulation, comprising a light source module, a light field beam splitting module, a polarization control module, a beam combining encoding module, a light spot detector, and a control and data processing module, wherein the light source module is used to output a coherent light source; the light field beam splitting module is used to divide the coherent light source into two light beams with known complex amplitude distribution, one beam is used as illumination light of a sample to be tested, and the other beam is used as wavefront modulated light; the polarization control module is used to control a polarization state between the illumination light beam and the wavefront modulated light beam, and control the polarization state of the two light beams to be parallel, vertical or an angle between 0 and 90 degrees according to different measurement requirements; the beam combining encoding module is used to use emitted light or reflected light of the sample to be tested as object light to be tested, and spatially overlap the object light to be tested and the wavefront modulated light, to form an encoded light field, and an overlap area is located in the light spot detector; the light spot detector is used to receive a light beam of the object light to be tested, to obtain an intensity distribution map of the object light to be tested, and output it to the control and data processing module; and obtain an encoded light field intensity distribution map; and the control and data processing module is used to control the light spot detector to record data, and process the intensity distribution map of the object light to be tested and the encoded light field intensity distribution map, to reconstruct the complex amplitude distribution of the sample to be tested.

Further, the phase imaging device based on the wavefront modulation of the present invention may further comprise an imaging module, wherein the imaging module is used to receive the light beam of the object light to be tested, and image the sample to be tested on the light spot detector.

In the phase imaging device based on the wavefront modulation of the present invention, the coherent light source (1) may be a single-wavelength coherent light source, a broad-spectrum coherent light source, or a laser cluster, and comprises a plurality of light sources with same or different wavelengths, the same light source or lasers of the same wavelength are coherent, and the different light sources or the different wavelengths are incoherent; and a first beam expander (4) and a second beam expander (6) beam-expand incident light into parallel light, spherical wave or structured light.

In the phase imaging device based on the wavefront modulation of the present invention, the light source module may be the coherent light source (1), and the light field beam splitting module consists of a beam splitter (3), a first reflector (5), the first beam expander (4), and the second beam expander (6), the polarization control module is a first polarization film (2), and the beam combining encoding module achieves the spatial overlap of the object light to be tested (25) and the wavefront modulated light (26) by controlling angles of the beam splitter (3) and the first reflector (5), and the control and data processing module is a computer (29); light generated by the coherent light source (1) passes through the first polarization film (2) and the beam splitter (3) sequentially and is divided into transmitted light and reflected light, and the transmitted light passes through the first beam expander (4) and is incident on the light spot detector (8), the reflected light passes through the first reflector (5), the second beam expander (6), and the sample to be tested (7) sequentially and reaches the light spot detector (8); emitted light of the first beam expander (4) is used as the wavefront modulated light (26), and emitted light of the second beam expander (6) is used as the object light to be tested (25); and the transmitted light and the reflected light divided by the beam splitter (3) are wavefront-encoded on a target surface of the light spot detector (8), a corresponding interference fringe is not limited to sampling requirements, and the light spot detector (8) is controlled by the computer (29).

In the phase imaging device based on the wavefront modulation of the present invention, the light source module may be the coherent light source (1), the light field beam splitting module consists of the beam splitter (3), the first reflector (5), the first beam expander (4), and the second beam expander (6), the polarization control module consists of a second polarization film (9) and a third polarization film (10), and the beam combining encoding module achieves the spatial overlap of the object light to be tested (25) and the wavefront modulated light (26) by controlling the angles of the beam splitter (3) and the first reflector (5); and the control and data processing module is the computer (29); the coherent light source (1) is divided into transmitted light and reflected light after passing through the beam splitter (3), the transmitted light passes through the second polarization film (9) and the first beam expander (4) sequentially and is incident on the light spot detector (8), and the reflected light passes through the first reflector (5), the second beam expander (6), and the sample to be tested (7) sequentially and reaches the light spot detector (8); the emitted light of the first beam expander (4) is used as the wavefront modulated light (26), the emitted light of the second beam expander (6) is used as the object light to be tested (25), the light spot detector (8) simultaneously records the encoded light field intensity distribution map containing two polarization states and the intensity distribution map of the object light to be tested, and the light spot detector (8) is controlled by the computer (29).

In the phase imaging device based on the wavefront modulation of the present invention, the light source module may be the coherent light source (1), the light field beam splitting module consists of the beam splitter (3), the first reflector (5), the first beam expander (4), and the second beam expander (6), the polarization control module is the first polarization film (2), the beam combining encoding module achieves the spatial overlap of the object light to be tested (25) and the wavefront modulated light (26) by controlling the angles of the beam splitter (3) and the first reflector (5), and the imaging module is a lens group (11); the control and data processing module is the computer (29); the coherent light source (1) is divided into transmitted light and reflected light after passing through the first polarization film (2) and the beam splitter (3) sequentially, the transmitted light passes through the first beam expander (4) and is incident on the light spot detector (8), and the reflected light passes through the first reflector (5), the second beam expander (6), the sample to be tested (7) and the lens group (11) sequentially and reaches the light spot detector (8); the emitted light of the first beam expander (4) is used as the wavefront modulated light (26), and emitted light of the lens group (11) is used as the object light to be tested (25); while the sample to be tested (7) is a large-aperture element, the lens group (11) shrinks emitted light of the sample to be tested (7), and while the sample to be tested (7) is a tiny sample, the lens group (11) enlarges the emitted light of the sample to be tested (7), and the light spot detector (8) is controlled by the computer (29).

In the phase imaging device based on the wavefront modulation of the present invention, the light source module may be the coherent light source (1), the light field beam splitting module consists of an optical fiber beam splitter (12), an optical fiber collimator (13), a reflector lens (16) and a collimating lens (15), the polarization control module is achieved by polarization parameters of the coherent light source (1) and the optical fiber beam splitter (12), the beam combining encoding module is achieved by controlling an angle of the optical fiber collimator (13), the imaging module is the lens group (11), a reflection-type sample (14) is a reflective sample, and the control and data processing module is the computer (29); the coherent light source (1) is coupled into the optical fiber beam splitter (12) by an optical fiber and then divided into two beams, one beam is collimated into parallel light or spherical wave by the optical fiber collimator (13) and reaches the light spot detector (8), the other beam as a point light source is reflected by the reflector lens (16) and then becomes parallel light through the collimating lens (15), and is irradiated on the reflection-type sample (14), after being reflected by the reflection-type sample (14), it passes through the collimating lens (15), the reflector lens (16) and the lens group (11) sequentially and is incident on the light spot detector (8) and imaged, and the light spot detector (8) is controlled by the computer (29).

In the phase imaging device based on the wavefront modulation of the present invention, the light source module may be the coherent light source (1), the light field beam splitting module consists of the beam splitter (3), the first reflector (5), the first beam expander (4) and the second beam expander (6), the polarization control module is the first polarization film (2), and the beam combing encoding module consists of a second reflector (30) and the reflector lens (16), the imaging module is the lens group (11), the sample to be tested (7) is a transmission-type sample, and the control and data processing module is the computer (29); the coherent light source (1) is divided into transmitted light and reflected light after passing through the first polarization film (2) and the beam splitter (3) sequentially, the transmitted light passes through the first beam expander (4), the second reflector (30) and the reflector lens (16) sequentially and is incident on the light spot detector (8), and the reflected light passes through the first reflector (5), the second beam expander (6), the sample to be tested (7), the lens group (11) and the reflector lens (16) sequentially and reaches the light spot detector (8); the emitted light of the first beam expander (4) is used as the wavefront modulated light (26), and the emitted light of the lens group (11) is used as the object light to be tested (25); while the sample to be tested (7) is the large-aperture element, the lens group (11) shrinks the emitted light of the sample to be tested (7), and while the sample to be tested (7) is the tiny sample, the lens group (11) enlarges the emitted light of the sample to be tested (7), and the light spot detector (8) is controlled by the computer (29).

In the phase imaging device based on the wavefront modulation of the present invention, the light source module may be the coherent light source (1), the light field beam splitting module consists of the optical fiber beam splitter (12), the optical fiber collimator (13) and a variable diaphragm (28), the polarization control module is achieved by the polarization parameters of the coherent light source (1) and the optical fiber beam splitter (12), the beam combining encoding module is achieved by controlling an angle of an optical fiber output head of the optical fiber beam splitter (12), the imaging module is the lens group (11), the sample to be tested (7) is the transmission-type sample, and the control and data processing module is the computer (29); the coherent light source (1) is coupled into the optical fiber beam splitter (12) by the optical fiber and then divided into two beams, one beam is collimated into parallel light or spherical wave by the optical fiber collimator (13), and then passes through the variable diaphragm (28) and the sample to be tested (7) sequentially and reaches the light spot detector (8) as the object light to be tested (25), and the other beam is incident on the light spot detector (8) as a point light source, and used as the wavefront modulated light (26), and the light spot detector (8) is controlled by the computer (29).

In the phase imaging device based on the wavefront modulation of the present invention, the light source module may be composed of a first single-wavelength laser (17), a second single-wavelength laser (18) and an optical fiber beam combiner (19), the light source module as a laser cluster comprises at least two single-wavelength lasers or a single laser containing a plurality of wavelengths, the optical field beam splitting module consists of the optical fiber beam splitter (12), the optical fiber collimator (13), the reflector lens (16), and a spherical reflector (20), the polarization control module is achieved by polarization parameters of the first single-wavelength laser (17), the second single-wavelength laser (18) and the optical fiber beam combiner (19), the beam combining encoding module is achieved by controlling an emitting angle of the optical fiber collimator (13), and the control and data processing module is the computer (29); output light of the first single-wavelength laser (17) and the second single-wavelength laser (18) is beam-combined by the optical fiber beam combiner (19), and then divided into two beams by the optical fiber beam splitter (12), each beam contains lasers of both the first single-wavelength laser (17) and the second single-wavelength laser (18) at the same time, wherein one beam is collimated into parallel light or spherical wave by the optical fiber collimator (13) and reaches the light spot detector (8) as the wavefront modulated light (26), and the other beam as a point light source is collimated into parallel light or spherical wave by the reflector lens (16) and spherical reflector (20) as the illumination light of the reflection-type sample (14), the reflection-type sample (14) is a flat-surface, spherical-surface, free-form surface or irregular spherical surface structure, reflected light of the reflection-type sample (14) is reflected by the spherical reflector (20), and then passes through the reflector lens (16) and reaches the light spot detector (8) as the object light to be tested (25), and the light spot detector (8) is controlled by the computer (29).

In the phase imaging device based on the wavefront modulation of the present invention, the light source module may be the coherent light source (1), the light field beam splitting module consists of the beam splitter (3), the first reflector (5), a first objective lens (21), a first small hole (22), a second objective lens (23), a second small hole (24), the reflector lens (16) and the collimating lens (15), the polarization control module is determined by the polarization parameters of the coherent light source (1), the beam combining encoding module is achieved by controlling an angle of the first reflector (5) and an optical axis of the first objective lens (21), and the imaging module is the lens group (11); the control and data processing module is the computer (29); the coherent light source (1) is divided into transmitted light and reflected light after passing through the beam splitter (3), the transmitted light passes through the first reflector (5), the first objective lens (21) and the first small hole (22) sequentially, and becomes a spherical wave and is incident on the light spot detector (8) as the wavefront modulated light (26), the reflected light passes through the second objective lens (23), the second small hole (24), the reflector lens (16) and the collimating lens (15) sequentially, and it is collimated into parallel light as the illumination light of the reflection-type sample (14), after being reflected by the reflection-type sample (14), it passes through the collimating lens (15), the reflector lens (16) and the lens group (11) sequentially and reaches the light spot detector (8) as the object light to be tested (25), while the reflection-type sample (14) is the large-aperture element, the lens group (11) shrinks the reflected light of the reflection-type sample (14), and while the reflection-type sample (14) is the tiny sample, the lens group (11) enlarges the reflected light of the reflection-type sample (14), and the light spot detector (8) is controlled by the computer (29).

In the phase imaging device based on the wavefront modulation of the present invention, the light source module may be the coherent light source (1), the light field beam splitting module consists of a prism (27), the first reflector (5) and the collimator lens (15), the polarization control module is determined by the polarization parameters of the coherent light source (1), the beam combing encoding module is achieved by controlling the angle of the first reflector (5), and the control and data processing module is the computer (29); the coherent light source (1) is an optical fiber output, and it is divided into transmitted light and reflected light by the prism (27) as a point light source, wherein the transmitted light is reflected by the first reflector (5) and then reflected by the prism (27) again, and reaches the light spot detector (8) as the wavefront modulated light (26), wherein the reflected light is collimated by the collimating lens (15) and then becomes parallel light, and is used as the illumination light of the reflection-type sample (14), the reflected light of the reflection-type sample (14) passes through the collimating lens (15) and the prism (27) sequentially, and reaches the light spot detector (8) as the object light to be tested (25), and the light spot detector (8) is controlled by the computer (29).

The present invention further provides a method for phase measurement using the phase imaging device based on the wavefront modulation as claimed in claim 1, comprising:

S1. opening a light source module, outputting a coherent light source, adjusting the light intensity and polarization control module of the coherent light source, and using a light spot detector to respectively record an intensity distribution map of object light to be tested $I_O$ and an encoded light field intensity map $I_C$ while there is a wavefront modulated light beam;

S2. reconstructing phase distribution of the intensity distribution map of object light to be tested $I_O$, specifically as follows:

(1) setting initial phase distribution $\varphi_O$ corresponding to the intensity distribution map of object light to be tested $I_O$, to obtain a complex amplitude of the object light to be tested $$E_O = \sqrt{I_O}\, e^{j\varphi_O};$$

(2) calculating an encoded light field $E_C$ after the object light to be tested is overlapped with wavefront modulated light, a formula is as follows:

$E_C = E_O + E_R$ in the formula, $E_R$ is a complex amplitude of the wavefront modulated light, and an error function $$\text{RMS} = \frac{\sum ||E_C|^2 - I_C|^2}{\sum |I_C|^2}$$

is calculated at the same time, wherein $\Sigma$ represents the summation of pixel points;

(3) using the actually recorded encoded light field intensity map $I_C$ to update the amplitude of the complex amplitude $E_C$ of the wavefront modulated light, to obtain an updated encoded light field complex amplitude $$E'_C = \sqrt{I_C}\, e^{j \cdot \text{angle}(E_C)},$$

wherein angle( ) represents that a phase is sampled, and j represents an imaginary number;

(4) removing a wavefront modulation process from the updated encoded light field complex amplitude $E_C'$, to obtain an updated complex amplitude of the object light to be tested $E_O' = E_C' - E_R$;

(5) constraining the updated complex amplitude of the object light to be tested $E_O'$ with a limited space condition, to obtain a further updated complex amplitude of the object light to be tested $E_O''$, and using as an initial guess for next time of iteration, selecting according to a specific situation, wherein the limited space comprises a limited frequency spectrum, limited focal plane distribution and limited spatial distribution on a specific location plane and the like;

(6) repeating the steps (2)-(5), until a Root Mean Square (RMS) value of the error function tends to be stable or unchanged, to obtain a final complex amplitude of the object light to be tested $E_O^f$; and (7) after propagating the complex amplitude of the object light to be tested $E_O^f$ to a surface or an image plane on which an object to be tested is located, divided by a corresponding complex amplitude of illumination light, to obtain a complex amplitude transmittance or reflectance function of the object to be tested, completing iterative calculation.

In the method for multi-modal phase measurement using the phase imaging device based on the wavefront modulation of the present invention, it may comprise the following steps:

S1. opening a light source module, outputting a coherent light source, adjusting the light intensity and polarization control module of the coherent light source, and using a light spot detector to respectively record an intensity distribution map of object light to be tested $I_O$ containing a plurality of modals and an encoded light field intensity map $I_C$ while there is a multi-modal wavefront modulated light beam, wherein the multi-modal represents that the light field contains a plurality of incoherent modes, it can be lasers with the same wavelength emitted by different polarization states, different wavelengths or different lasers;

S2. reconstructing phase distribution of the intensity distribution map of object light to be tested $I_O$, specifically as follows:

(1) assuming that the intensity distribution map of object light to be tested $I_O$ is composed of N incoherent modes, corresponding initial phase distribution is: $^1\varphi_O$, $^2\varphi_O$ ... $^N\varphi_O$, respectively, and obtained corresponding complex amplitudes of the object light to be tested are $$^1E_O = \sqrt{^1\alpha I_O}\, e^{j\,^1\varphi_O},\, ^2E_O = \sqrt{^2\alpha I_O}\, e^{j\,^2\varphi_O},\, \ldots,\, ^N E_O = \sqrt{^N\alpha I_O}\, e^{j\,^N\varphi_O},$$

respectively, N≥2, wherein $^N\alpha$ represents an energy ratio of the N-th mode at different pixel points in the intensity distribution map of the object light to be tested, and is a two-dimensional matrix;

(2) calculating encoded light field distribution, wherein a formula of an encoded light field $_N E_C$ after the N-th mode of the object light to be tested is overlapped with the N-th mode of wavefront modulated light is as follows:

$_N E_C = {_N E_O} + {_N E_R}$ in the formula, $_N E_R$ is a complex amplitude of the N-th mode of the wavefront modulated light, and an error function $$\text{RMS} = \frac{\sum_{pixel} \left| \sum_N |_N E_C|^2 - I_C \right|^2}{\sum_{pixel} I_C}$$

is calculated at the same time, wherein $$\sum_{pixel}$$

represents the summation of pixel points;

(3) using the actually recorded encoded light field intensity map $I_C$ to update the encoded light field in all modes, wherein an update method of the complex amplitude $_N E_C$ of the N-th mode of the wavefront modulated light is as follows:

$$_N E'_C = \sqrt{_N \beta I_C}\, e^{j \cdot \text{angle}(_N E_C)}$$

wherein $_N \beta$ represents an energy ratio of the N-th mode at different pixel points in the encoded light field intensity map, and is a two-dimensional matrix;

(4) removing a wavefront modulation process in the different modes, to obtain an updated complex amplitude of the N-th mode of the object light to be tested $_N E_O' = {_N E_C'} - {_N E_R}$;

(5) constraining the updated complex amplitude $_N E_O'$ of the object light to be tested in different modes with a limited space condition, to obtain a further updated complex amplitude $_N E_O''$ of the object light to be tested in the different modes, using as an initial guess for the next time of iteration, and selecting according to a specific situation, wherein the limited space comprises a limited frequency spectrum, limited focal plane distribution and limited spatial distribution on a specific location plane and the like;

(6) repeating the steps (2)-(5), until a Root Mean Square (RMS) value of the error function tends to be stable or unchanged, to obtain a final complex amplitude $_N E_O^f$ of the object light to be tested in the different modes; and (7) after propagating $_N E_O^f$ to a surface or an image plane on which an object to be tested is located, divided by a complex amplitude of illumination light in the corresponding mode, to obtain a complex amplitude transmittance or reflectance function corresponding to the N-th mode of the object to be tested, completing iterative calculation.

Compared with the existing technology, the technical effects of the present invention are as follows:

(1) Under a condition without increasing the number of light spots, the twin image problem may be eliminated only by the iterative calculation, and conventional methods such as four-step phase shifting are not required.

(2) As there is no frequency interception process in digital holography, high-frequency information is not lost, and combined with a feature of a phase recovery technology that may achieve the diffraction limit resolution, the present invention has the higher spatial resolution.

(3) The present invention has loose sampling requirements, and an interference fringe may still achieve the wavefront reconstruction under undersampling.

(4) The present invention has the ability of multi-state measurement, which may achieve the simultaneous reconstruction of the complex amplitude distribution of different polarization states or different wavelengths.

Reference numbers refer to the following structures in the figures: 1—Coherent light source, 2—First polarization film, 3—Beam splitter, 4—First beam expander, 5—First reflector, 6—Second beam expander, 7—Sample to be tested, 8—Light spot detector, 9—Second polarization film, 10—Third polarization film, 11—Lens group, 12—Optical fiber beam splitter, 13—Optical fiber collimator, 14—Reflection-type sample, 15—Collimating lens, 16—Reflector lens, 17—First single-wavelength laser, 18—Second single-wavelength laser, 19—Optical fiber beam combiner, 20—Spherical reflector, 21—First objective lens, 22—First small hole, 23—Second objective lens, 24—Second small hole, 25—Object light to be tested, 26—Wavefront modulated light, 27—Prism, 28—Variable diaphragm, 29—Computer, 30—Second reflector.

DETAILED DESCRIPTION OF THE INVENTION

The advantages of the present invention is made clear and easy to understand in view of the specific embodiments as described in detail below with reference to the drawings. It should be noted that the present invention should not be limited to the content of the following specific embodiments. Those skilled in the art should understand the present invention from the spirit embodied in the following embodiments, and various technical terms may be understood in the broadest sense on the basis of the spirit essence of the present invention.

Figure 1:
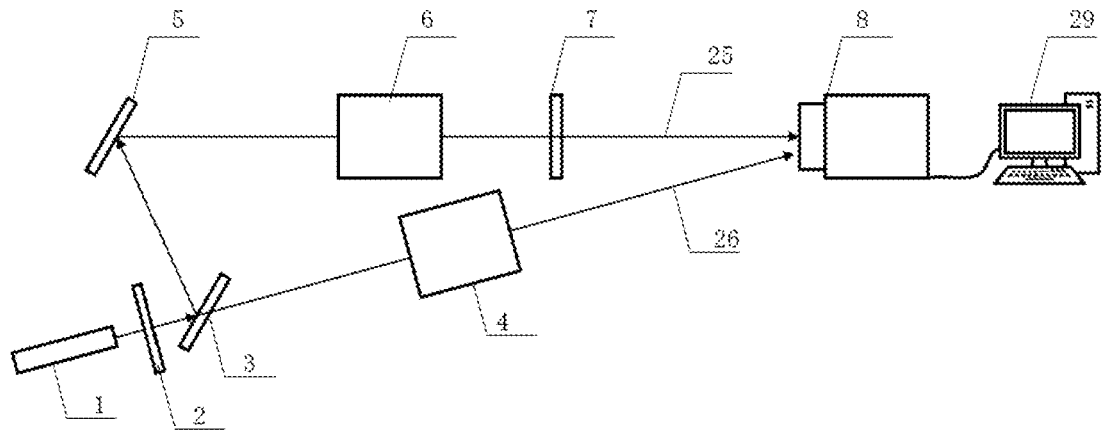
FIG. 1 shows the structure of a phase imaging device based on wavefront modulation in the first embodiment of the present invention.

In the first embodiment, a biological sample complex amplitude transmittance measurement device is arranged by using a light path shown in FIG. 1. A light source module is a He—Ne laser. Generated light is divided into transmitted light and reflected light after passing through a first polarization film and a beam splitter sequentially, the transmitted light is collimated into parallel light of 30 mm diameter after passing through a first beam expander, incident on a light spot detector and used as wavefront modulated light. The pixel number of the light spot detector is 4096×4096, and the pixel size is 9 micrometers. After the reflected light passes through a first reflector and a second beam expander sequentially, it becomes a parallel beam and irradiates a biological slice of a sample to be tested. The transmitted light thereof propagates for 10 mm and then reaches the light spot detector and is used as object light to be tested; the object light to be tested and the wavefront modulated light are subjected to wavefront encoding on a target surface of the light spot detector, and an included angle between optical axes of the two beams of the light is 10 degrees.

Figure 2:
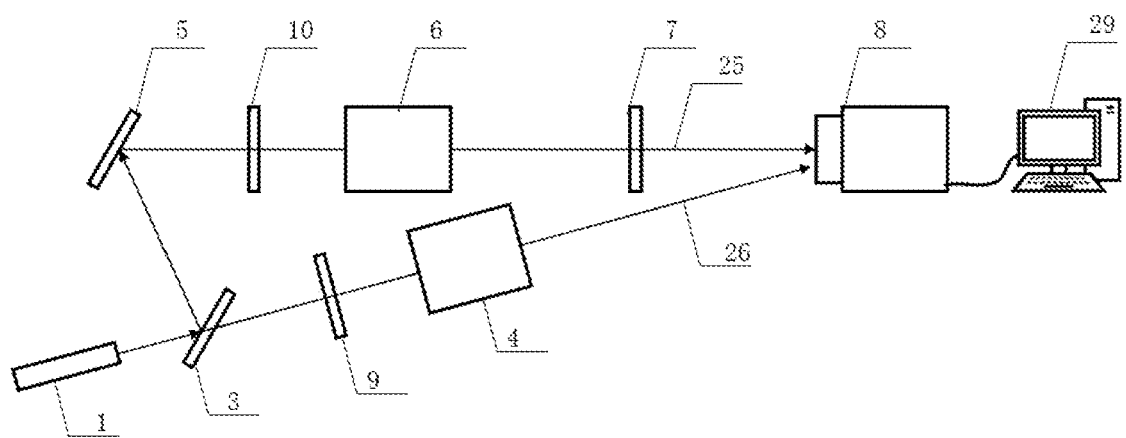
FIG. 2 shows the structure of the phase imaging device based on the wavefront modulation in the second embodiment of the present invention.

In the second embodiment, a complex amplitude transmittance detection device of a birefringent optical element is arranged by using a light path shown in FIG. 2. A coherent light source is a laser with a wavelength of 526.5 nm, it is divided into transmitted light and reflected light after passing through a beam splitter. The transmitted light passes through a second polarization film and a first beam expander sequentially and is incident on a light spot detector. Emitted light of the first beam expander is a diverging spherical wave, and it is used as wavefront modulated light at the same time. After the reflected light passes through a first reflector and a second beam expander sequentially and becomes parallel light, it is used as illumination light of an element to be tested, and emitted light of the element to be tested is used as object light to be tested.

A light source module is opened to output the coherent light source, the light intensity and polarization control module of the coherent light source are adjusted, so that a polarization angle of the wavefront modulated light and the illumination light of the sample to be tested is 45 degrees, the light spot detector is used to respectively record an intensity distribution map of object light to be tested $I_O$ containing two polarization states and an encoded light field intensity map $I_C$ while there are two polarization state wavefront modulated light beams.

Phase distribution of the intensity distribution map of object light to be tested $I_O$ is reconstructed, specifically as follows:

(1) assuming that the intensity distribution map of object light to be tested $I_O$ is composed of 2 incoherent polarization modes, namely it is considered that there are two light fields of p-polarization and s-polarization in the light field at the same time, corresponding initial phase distribution is: $^1\varphi_O$, $^2\varphi_O$ respectively, and obtained corresponding complex amplitudes of the object light to be tested are $$^1E_O = \sqrt{^1\alpha I_O}\, e^{j^1\varphi_O},\ ^2E_O = \sqrt{^2\alpha I_O}\, e^{j^2\varphi_O},$$

respectively, herein $^N\alpha$ represents an energy ratio of the N-th mode at different pixel points in the intensity distribution map of the object light to be tested, which is a two-dimensional matrix, and N is 1 or 2;

(2) calculating encoded light field distribution, herein a formula of an encoded light field $_NE_C$ after the N-th mode of the object light to be tested is overlapped with the N-th mode of the wavefront modulated light is as follows:

$$_NE_C = {_NE_O} + {_NE_R}$$

in the formula, $_NE_R$ is a complex amplitude of the N-th mode of the wavefront modulated light, and an error function $$\text{RMS} = \frac{\sum_{pixel}\left|\sum_N |_NE_C|^2 - I_C\right|^2}{\sum_{pixel} I_C}$$

is calculated at the same time, herein $$\sum_{pixel}$$

represents the summation of pixel points;

(3) using the actually recorded encoded light field intensity map $I_C$ to update the encoded light field in all modes, herein an update method of the complex amplitude $_NE_C$ of the N-th mode of the wavefront modulated light is as follows:

$$_NE_C' = \sqrt{_N\beta I_C}\, e^{j\cdot angle(_NE_C)}$$

herein $_N\beta$ represents an energy ratio of the N-th mode at different pixel points in the encoded light field intensity map, and is a two-dimensional matrix;

(4) removing a wavefront modulation process in the different modes, to obtain an updated complex amplitude of the N-th mode of the object light to be tested $_NE_O' = {_NE_C'} - {_NE_R}$;

(5) constraining the updated complex amplitude $_NE_O'$ of the object light to be tested in different modes with a limited space condition, to obtain a further updated complex amplitude $_NE_O'' = \mathfrak{I}^{-1}\{\mathfrak{I}(_NE_O')\times Fxy(r)\}$ of the object light to be tested in the different modes, using as an initial guess for the next time of iteration, herein $\mathfrak{I}(\ )$ and $\mathfrak{I}^{-1}(\ )$ represent Fourier transform and inverse Fourier transform respectively, Fxy(r) represents a hole function of which a radius is r, the center is the strongest frequency point of $_NE_O'$, and r is gradually increased with the increase of the number of iterations;

(6) repeating the steps (2)-(5), until a Root Mean Square (RMS) value of the error function tends to be stable or unchanged, to obtain a final complex amplitude $_NE_O^f$ of the object light to be tested in the different modes; and (7) after propagating $_NE_O^f$ to a surface or an image plane on which an object to be tested is located, divided by a complex amplitude of illumination light in the corresponding mode, to obtain a complex amplitude transmittance or reflectance function corresponding to the N-th mode of the object to be tested, completing iterative calculation.

The light intensity and polarization control module of the coherent light source are adjusted, so that the polarization angles of the wavefront modulated light and the illumination light of the sample to be tested are 0 degrees and 90 degrees respectively, a set of data is recorded for each, and the illumination light of the sample to be tested is adjusted to circularly polarized light to record another set at the same time, the above iterative calculation is repeated, and a reconstruction result is used to analyze the birefringence characteristics of the sample to be tested.

Figure 3:
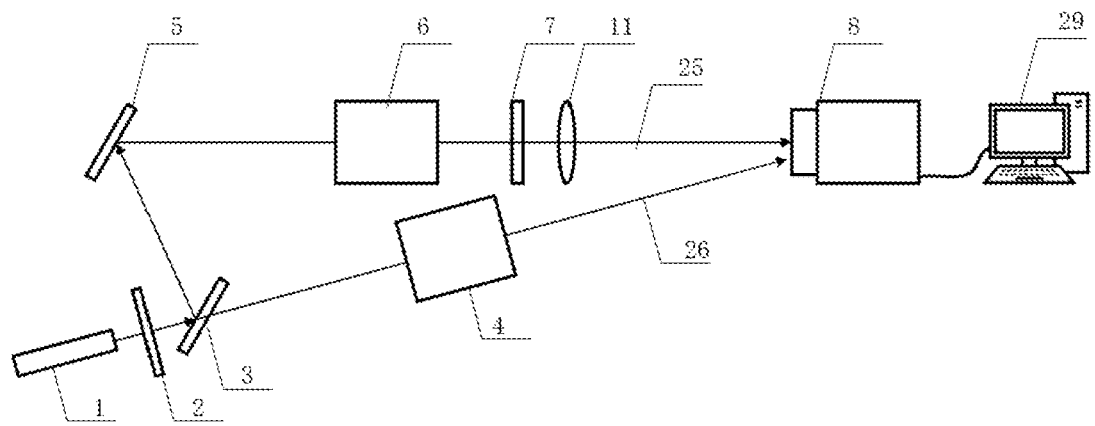
FIG. 3 shows the structure of the phase imaging device based on the wavefront modulation in the third embodiment of the present invention.

In the third embodiment, a microscopic phase measurement device is arranged by using a light path shown in FIG. 3. A coherent light source outputs ns pulsed light with a wavelength of 351 nm, and it is divided into transmitted light and reflected light after passing through a first polarization film and a beam splitter sequentially. The transmitted light passes through a first beam expander provided with a random scattering sheet and becomes a speckle light field, and is incident on a light spot detector and is used as wavefront modulated light. The reflected light passes through a first reflector, a second beam expander, a sample to be tested, and a lens group sequentially, and then reaches the light spot detector, the lens group magnifies the sample to be tested by 10 times and then images it on the light spot detector, and it is used as object light to be tested, and the light spot detector (8) is controlled by a computer (29).

Figure 4:
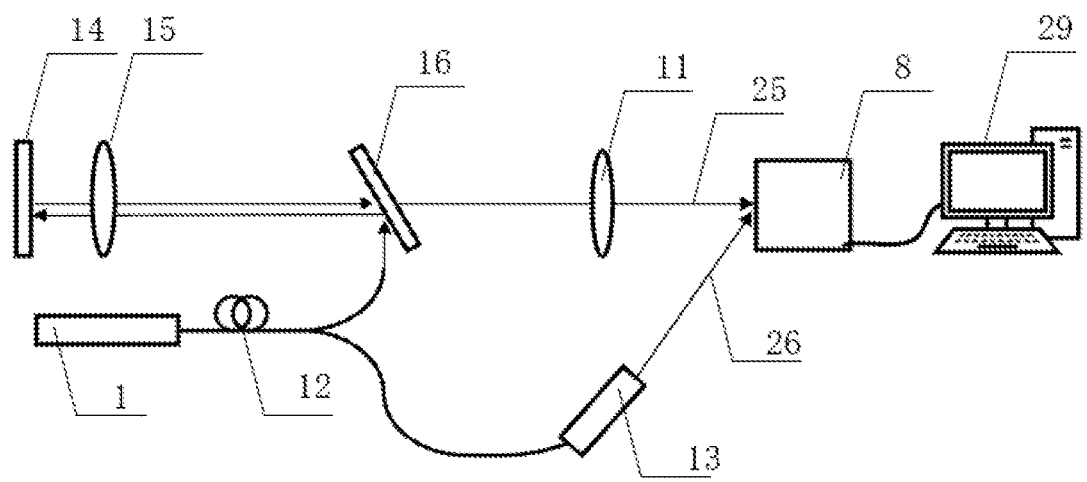
FIG. 4 shows the structure of the phase imaging device based on the wavefront modulation in the fourth embodiment of the present invention.

In the fourth embodiment, a large-diameter element surface-type detection device is arranged by using a light path shown in FIG. 4. A 633 nm coherent laser generated by a coherent light source is divided into two beams after passing through an optical fiber beam splitter, one beam is collimated into parallel light through an optical fiber collimator and then reaches a light spot detector as wavefront modulated light, and the other beam is reflected by a reflector lens as a point light source, and then becomes parallel light through a collimating lens, and irradiates a reflection-type sample. After being reflected by the reflection-type sample, it passes through the collimating lens, the reflector lens and a lens group sequentially and then is incident on a light spot detector and imaged, this light beam is used as object light to be tested, and the light spot detector is controlled by a computer.

Figure 5:
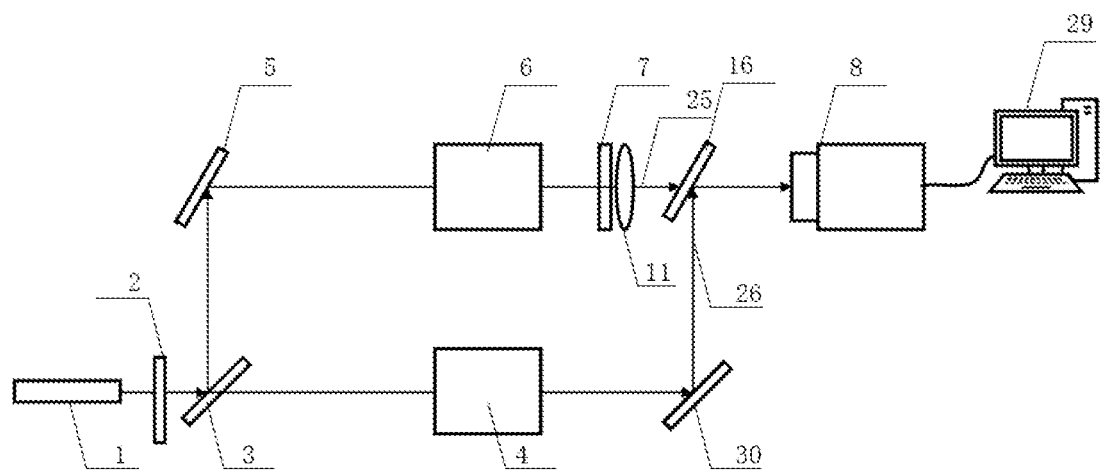
FIG. 5 shows the structure of the phase imaging device based on the wavefront modulation in the fifth embodiment of the present invention.

In the fifth embodiment, an optical element transmittance measuring device is arranged by using a light path shown in FIG. 5. A coherent light source is divided into two paths by a beam splitter after passing through a first polarization. Transmitted light is expanded by a first beam expander into a spherical wave, and after being reflected by a reflector and a reflector lens, it reaches a light spot detector as a wavefront modulated light field. The modulated light field is reconstructed by using a coherent modulation imaging technology or a Ptychography phase recovery algorithm and used as a known condition. Reflected light of the beam splitter passes through the reflector and a second beam expander sequentially and then becomes parallel light with a diameter of 300 mm. After passing through an imaging system, it passes through the reflector lens to reach a light spot detector and is used as object light to be tested. Here, the imaging system is an aspherical lens having a focal length of 1 m, the light spot detector is located 10 mm behind a focal point, and a sample to be tested with a diameter of 300 mm is placed close to the imaging system. At this time, the light spot detector is located on a defocusing surface of the element to be tested. While the light field distribution of object light to be tested is obtained by reconstruction, imaging may be achieved by digital focusing.

Figure 6:
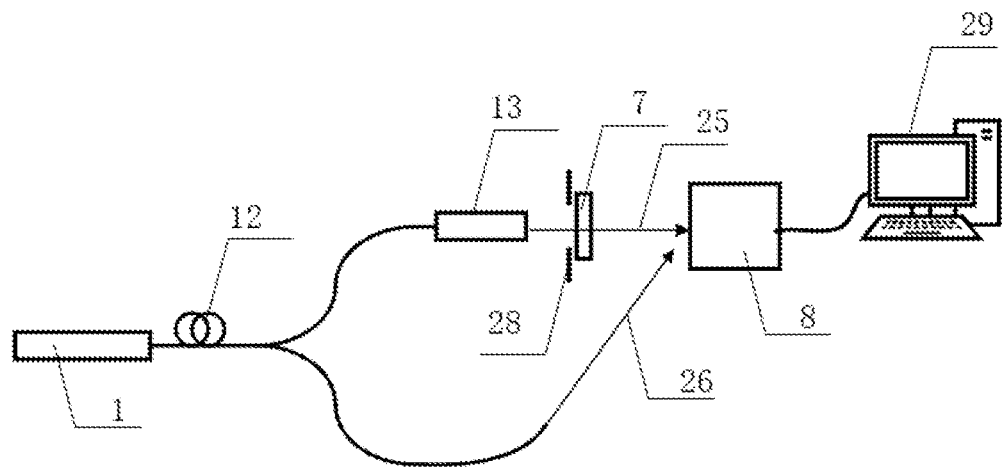
FIG. 6 shows the structure of the phase imaging device based on the wavefront modulation in the sixth embodiment of the present invention.

In the sixth embodiment, a biological sample phase imaging device is arranged by using a light path shown in FIG. 6. After a coherent light source (ns pulse light, a wavelength in the center is 1053 nm) is beam-split by an optical fiber beam splitter, one beam is used as a point light source to irradiate a light spot detection as wavefront modulated light, and the other beam becomes parallel light through an optical fiber collimator and irradiates a sample to be tested. A variable diaphragm is placed in front of the sample to be tested, and emitted light of the sample to be tested reaches the light spot detector as object light to be tested.

Figure 7:
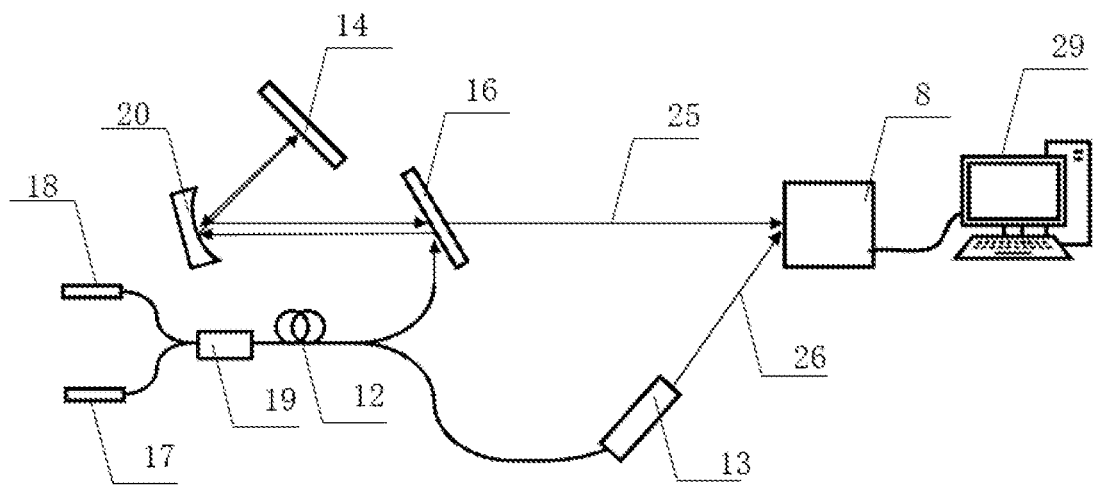
FIG. 7 shows the structure of the phase imaging device based on the wavefront modulation in the seventh embodiment of the present invention.

In the seventh embodiment, a dual-wavelength reflection-type free-form surface element detection device is arranged by using a light path shown in FIG. 7. After a first single-wavelength laser ($\lambda 1=632$ nm) and a second single-wavelength laser ($\lambda 2=633$ nm) are beam-combined by an optical fiber beam combiner, it is beam-split again by an optical fiber beam splitter. One beam is collimated by an optical fiber collimator into parallel light with a diameter of 50 mm and reaches a light spot detector as wavefront modulated light. One beam is used as a point light source, and after being reflected by a reflector lens, it reaches a spherical reflector, and is collimated into parallel light containing two wavelengths to irradiate a reflection-type free-form surface optical element. After being reflected, it passes through the spherical reflector and a reflector lens sequentially and then reaches the light spot detector as object light to be tested.

A light source module is opened, and the light spot detector is used to respectively record an intensity distribution map of object light to be tested $I_O$ containing two wavelengths and an encoded light field intensity map $I_O$ while there are two wavelength wavefront modulated light beams.

Phase distribution of the intensity distribution map of object light to be tested $I_O$ is reconstructed, specifically as follows:

(1) assuming that the intensity distribution map of object light to be tested $I_O$ is formed by superposition of beam intensities of two wavelengths, corresponding to $\lambda 1$ and $\lambda 2$ respectively, and corresponding initial phase distribution is: $^1\varphi_O$, $^2\varphi_O$, respectively, and obtained corresponding complex amplitudes of the object light to be tested are $$^1E_O = \sqrt{^1\alpha I_O}\, e^{j^1\varphi_O},$$

$$^2E_O = \sqrt{^2\alpha I_O}\, e^{j^2\varphi_O},$$

respectively, herein $^N\alpha$ represents an energy ratio of the N-th mode at different pixel points in the intensity distribution map of the object light to be tested, which is a two-dimensional matrix, and N is 1 or 2, the different wavelengths correspond to different modes at this time;

(2) calculating encoded light field distribution, herein a formula of an encoded light field $_NE_C$ after the N-th mode of the object light to be tested is overlapped with the N-th mode of the wavefront modulated light is as follows:

$$_NE_C = {_N}E_O + {_N}E_R$$

in the formula, $_NE_R$ is a complex amplitude of the N-th mode of the wavefront modulated light, and an error function $$\text{RMS} = \frac{\sum_{pixel}\left|\sum_N |_NE_C|^2 - I_C\right|^2}{\sum_{pixel} I_C}$$

is calculated at the same time, herein $$\sum_{pixel}$$

represents the summation of pixel points;

(3) using the actually recorded encoded light field intensity map $I_C$ to update the encoded light field in all modes, herein an update method of the complex amplitude $_NE_C$ of the N-th mode of the wavefront modulated light is as follows:

$$_NE'_C = \sqrt{_N\beta I_C}\, e^{j\cdot angle(_NE_C)}$$

herein $_N\beta$ represents an energy ratio of the N-th mode at different pixel points in the encoded light field intensity map, and is a two-dimensional matrix;

(4) removing a wavefront modulation process in the different modes, to obtain an updated complex amplitude of the N-th mode of the object light to be tested $_NE_O' = {_N}E_C' - {_N}E_R$;

(5) constraining the updated complex amplitude $_NE_O'$ of the object light to be tested in different modes with a limited space condition, to obtain a further updated complex amplitude $_NE_O'' = \mathfrak{J}^{-1}\{\mathfrak{J}(_NE_O') \times Fxy(r)\}$ of the object light to be tested in the different modes, using as an initial guess for the next time of iteration, herein $\Im( )$ and $\Im^{-1}( )$ represent Fourier transform) and inverse Fourier transform respectively, Fxy(r) represents a hole function of which a radius is r, the center is the strongest frequency point of $_NE_O'$, and r is gradually increased with the increase of the number of iterations; and (6) repeating the steps (2)-(5), until a Root Mean Square (RMS) value of the error function tends to be stable or unchanged, to obtain a final complex amplitude $_NE_0^f$ of the object light to be tested in the different modes.

After $_NE_0^f$ is propagated to a surface on which an object to be tested is located, reflected light corresponding to the two wavelengths of the sample to be tested is obtained. After the sample to be tested is replaced with a standard reflector, it is repeated to record according to the above steps and reconstruct the reflected light corresponding to different wavelengths of the standard reflector, and it is divided with the reflected light of the free-form surface element to be tested, to obtain the complex amplitude reflectance of the free-form surface element to be tested at two wavelengths. Through wavelength synthesis, a reflective surface type without phase wrapping may be obtained.

Figure 8:
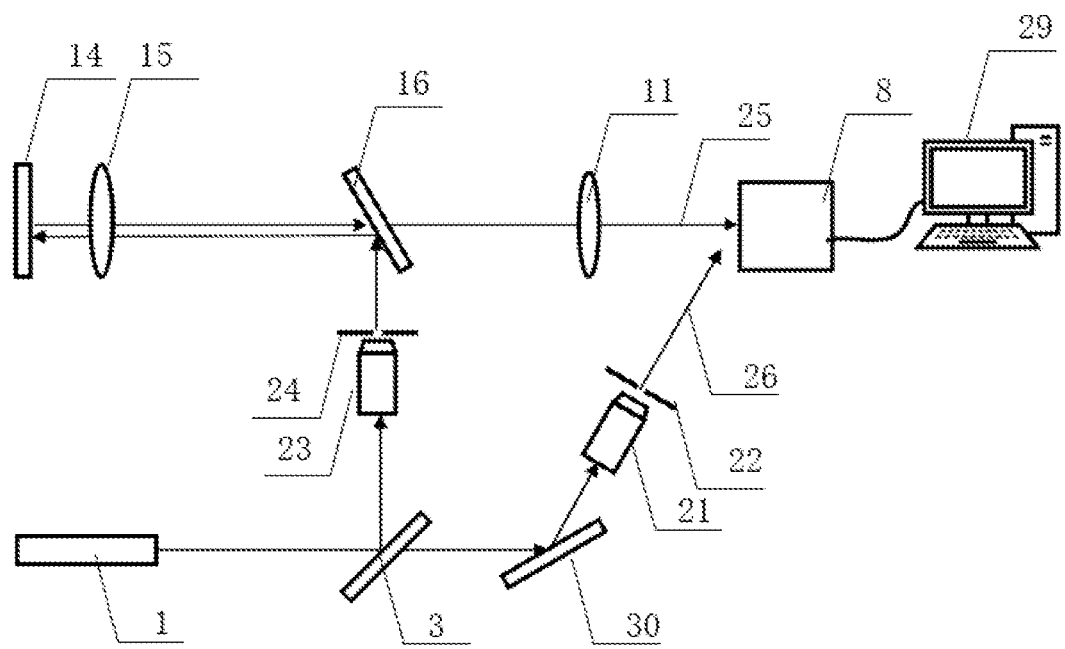
FIG. 8 shows the structure of the phase imaging device based on the wavefront modulation in the eighth embodiment of the present invention.

In the eighth embodiment, a reflection-type optical element detection device adopts a measurement light path shown in FIG. 8, and a quasi-continuous light laser with a wavelength of 526 nm is used as a coherent light source. After being beam-split by a beam splitter, transmitted light passes through a reflector, a first objective lens and a first small hole sequentially and becomes a diverging spherical wave, it reaches a light spot detector and is used as wavefront modulated light. Reflected light of the beam splitter passes through a second objective lens and a second small hole sequentially and becomes a spherical wave. After being reflected by a reflector lens, it reaches a collimating lens having a focal length of 2 m, and becomes parallel light with a diameter of 500 mm. After it irradiates a reflection-type sample, reflected light passes through the reflector lens and a lens group sequentially, and reaches a light spot detector as object light to be tested. A target surface of the light spot detector and the reflection-type sample are in a conjugate relationship mutually with respect to a collimating lens and the lens group, namely an image surface of the reflection-type sample is located on the target surface of the light spot detector. While the reflection-type sample is a standard reflector, cavity calibration data is recorded, and while the reflection-type sample is a sample to be tested, measurement data is recorded, the complex amplitude distributions of a light spot detection surface in two cases are obtained by reconstruction of iterative calculation, and a phase difference of the two divided by 2 is the surface-type distribution of the element to be tested.

Figure 9:
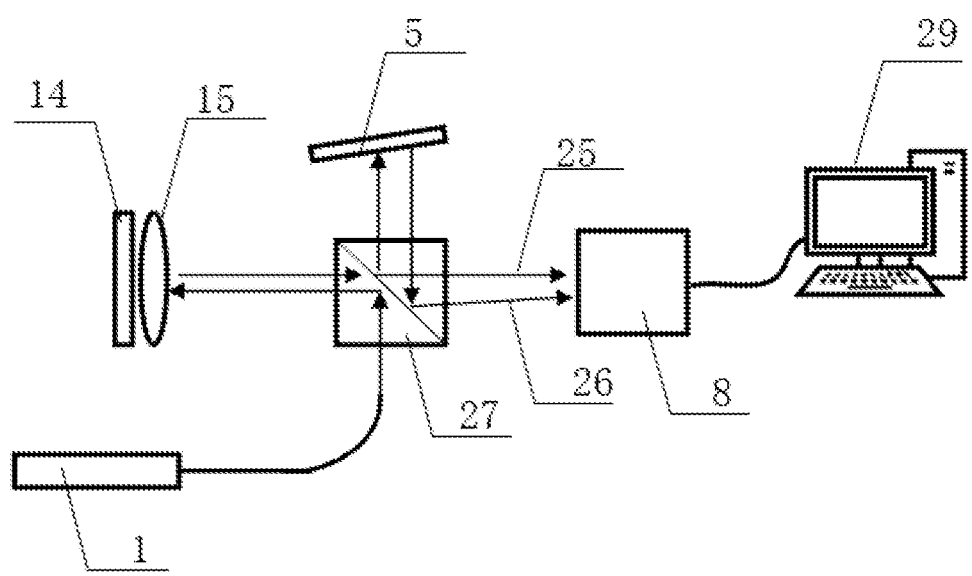
FIG. 9 shows the structure of the phase imaging device based on the wavefront modulation in the ninth embodiment of the present invention.

In the ninth embodiment, a reflection-type optical element detection device adopts a measurement light path shown in FIG. 9, and emitted light of a coherent light source (optical fiber laser) with a wavelength of 526 nm is used as a point light source. After passing through a prism, transmitted light thereof is reflected by a reflector and reflected by the prism again, and irradiates a light spot detector as wavefront modulated light. Reflected light of the prism becomes parallel light after passing through a collimating lens and irradiates a reflection-type sample. The reflection-type sample is close to the collimating lens. After being reflected, it passes through the collimating lens and the prism sequentially and then reaches a light spot detector as object light to be tested. While the reflection-type sample is a standard reflector, a set of cavity calibration data is recorded, and while the reflection-type sample is a sample to be tested, a set of measurement data is recorded, the complex amplitude distributions of a light spot detection surface in two cases are obtained by reconstruction of iterative calculation, it is reversely propagated to a frequency surface on which the collimating lens is located, and a phase difference of the two divided by 2 is the surface-type distribution of the element to be tested.

We claim:

1. A phase imaging device based on the wavefront modulation, comprising:
   a light source module, wherein the light source module is a coherent light source (1),
   a light field beam splitting module, wherein the light field beam splitting module consists of a beam splitter (3), a first reflector (5), a first beam expander (4), and a second beam expander (6),
   a polarization control module, wherein the polarization control module is a first polarization film (2),
   a beam combining encoding module, wherein the beam combining encoding module achieves spatial overlap of an object light to be tested (25) and a wavefront modulated light (26) by controlling angles of the beam splitter (3) and the first reflector (5),
   a light spot detector (8), and
   a control and data processing module, wherein the control and data processing module is a computer (29),
   wherein a light generated by the coherent light source (1) passes through the first polarization film (2) and the beam splitter (3) sequentially and is divided into a transmitted light and a reflected light,
   the transmitted light passes through the first beam expander (4) and is incident on the light spot detector (8),
   the reflected light passes through the first reflector (5), the second beam expander (6), and a sample to be tested (7) sequentially and reaches the light spot detector (8);
   an emitted light of the first beam expander (4) is used as the wavefront modulated light (26), and an emitted light of the second beam expander (6) is used as the object light to be tested (25); and
   the transmitted light and the reflected light divided by the beam splitter (3) are wavefront-encoded on a target surface of the light spot detector (8), a corresponding interference fringe is not limited to sampling requirements, and the light spot detector (8) is controlled by the computer (29).

2. The phase imaging device based on the wavefront modulation as claimed in claim 1, further comprising
   an imaging module, wherein the imaging module is a lens group (11),
   wherein the coherent light source (1) is divided into the transmitted light and the reflected light after passing through the first polarization film (2) and the beam splitter (3) sequentially,
   the transmitted light passes through the first beam expander (4) and is incident on the light spot detector (8), and the reflected light passes through the first reflector (5), the second beam expander (6), the sample to be tested (7) and the lens group (11) sequentially and reaches the light spot detector (8);
   the emitted light of the first beam expander (4) is used as the wavefront modulated light (26), and emitted light of the lens group (11) is used as the object light to be tested (25);
   while the sample to be tested (7) is a large-aperture element, the lens group (11) shrinks emitted light of the sample to be tested (7), and while the sample to be tested (7) is a tiny sample, the lens group (11) enlarges the emitted light of the sample to be tested (7), and the light spot detector (8) is controlled by the computer (29).

3. A method for phase measurement using the phase imaging device based on the wavefront modulation as claimed in claim 1, comprising:

S1. opening the light source module, outputting the coherent light source (1), adjusting light intensity of the coherent light source (1) and polarization control module, and using the light spot detector (8) to respectively record an intensity distribution map of the object light to be tested $I_O$ and an encoded light field intensity map $I_C$ while there is the wavefront modulated light beam;

S2. reconstructing phase distribution of the intensity distribution map of the object light to be tested $I_O$ as follows:

(i) setting initial phase distribution $\varphi_O$ corresponding to the intensity distribution map of the object light to be tested $I_O$, to obtain a complex amplitude of the object light to be tested $$E_O = \sqrt{I_O}\, e^{j\varphi_O};$$

(ii) calculating an encoded light field $E_C$ after the object light to be tested is overlapped with the wavefront modulated light, a formula is as follows:

$$E_C = E_O + E_R$$

in the formula, $E_R$ is a complex amplitude of the wavefront modulated light, and an error function $$\mathrm{RMS} = \sqrt{\frac{\sum \left||E_C|^2 - I_C\right|^2}{\sum |I_C|^2}}$$

is calculated at the same time, wherein $\Sigma$ represents the summation of pixel points;

(iii) using the actually recorded encoded light field intensity map $I_C$ to update the amplitude of the complex amplitude $E_C$ of the wavefront modulated light, to obtain an updated encoded light field complex amplitude $$E'_C = \sqrt{I_C}\, e^{j\cdot \mathrm{angle}(E_C)},$$

wherein angle( ) represents that a phase is sampled, and j represents an imaginary number;

(iv) removing a wavefront modulation process from the updated encoded light field complex amplitude $E_C'$, to obtain an updated complex amplitude of the object light to be tested $E_O' = E_C' - E_R$;

(v) constraining the updated complex amplitude of the object light to be tested $E_O'$ with a limited space condition, to obtain a further updated complex amplitude of the object light to be tested $E_O''$, and using as an initial guess for next time of iteration, selecting according to a specific situation, wherein the limited space comprises a limited frequency spectrum, limited focal plane distribution and limited spatial distribution on a specific location plane and the like;

(vi) repeating the steps (2)-(5), until a Root Mean Square (RMS) value of the error function tends to be stable or unchanged, to obtain a final complex amplitude of the object light to be tested $E_O^f$; and (vii) after propagating the complex amplitude of the object light to be tested $E_O^f$ to a surface or an image plane on which an object to be tested is located, divided by a corresponding complex amplitude of illumination light, to obtain a complex amplitude transmittance or reflectance function of the object to be tested, completing iterative calculation.

4. A method for multi-modal phase measurement using the phase imaging device based on the wavefront modulation as claimed in claim 1, comprising:

S1. opening the light source module, outputting the coherent light source (1), adjusting the light intensity of the coherent light source (1) and the polarization control module, and using the light spot detector (8) to respectively record an intensity distribution map of the object light to be tested $I_O$ containing a plurality of modals and an encoded light field intensity map $I_C$ while there is a multi-modal wavefront modulated light beam, wherein the multi-modal represents that the light field contains a plurality of incoherent modes that are lasers with the same wavelength emitted by different polarization states, different wavelengths or different lasers;

S2. reconstructing phase distribution of the intensity distribution map of the object light to be tested $I_O$, specifically as follows:

(i) assuming that the intensity distribution map of the object light to be tested $I_O$ is composed of N incoherent modes, corresponding initial phase distribution is: $^1\varphi_O$, $^2\varphi_O \ldots {}^N\varphi_O$, respectively, and obtained corresponding complex amplitudes of the object light to be tested are $$^1E_O = \sqrt{^1\alpha I_O}\, e^{j\,^1\varphi_O},\, ^2E_O = \sqrt{^2\alpha I_O}\, e^{j\,^2\varphi_O},\, \ldots,\, ^NE_O = \sqrt{^N\alpha I_O}\, e^{j\,^N\varphi_O},$$

respectively, N≥2, wherein $^N\alpha$ represents an energy ratio of the N-th mode at different pixel points in the intensity distribution map of the object light to be tested, and is a two-dimensional matrix;

(ii) calculating encoded light field distribution, wherein a formula of an encoded light field $_NE_C$ after the N-th mode of the object light to be tested is overlapped with the N-th mode of the wavefront modulated light is as follows:

$$_NE_C = {}_NE_O + {}_NE_R$$

in the formula, $_NE_R$ is a complex amplitude of the N-th mode of the wavefront modulated light, and an error function $$\mathrm{RMS} = \frac{\sum_{pixel}\left|\sum_N |_NE_C|^2 - I_C\right|^2}{\sum_{pixel} I_C}$$

is calculated at the same time, wherein $$\sum_{pixel}$$

represents the summation of pixel points;

(iii) using the actually recorded encoded light field intensity map $I_C$ to update the encoded light field in all modes, wherein an update method of the complex amplitude $_N E_C$ of the N-th mode of the wavefront modulated light is as follows:

$$_N E'_C = \sqrt{_N \beta I_C}\, e^{j \cdot \text{angle}(_N E_C)}$$

wherein $_N\beta$ represents an energy ratio of the N-th mode at different pixel points in the encoded light field intensity map, and is a two-dimensional matrix;

(iv) removing a wavefront modulation process in the different modes, to obtain an updated complex amplitude of the N-th mode of the object light to be tested $_N E_O' = _N E_C' - _N E_R$;

(v) constraining the updated complex amplitude $_N E_O'$ of the object light to be tested in different modes with a limited space condition, to obtain a further updated complex amplitude $_N E_O''$ of the object light to be tested in the different modes, using as an initial guess for the next time of iteration, and selecting according to a specific situation, wherein the limited space comprises a limited frequency spectrum, limited focal plane distribution and limited spatial distribution on a specific location plane and the like;

(vi) repeating the steps (2)-(5), until a Root Mean Square (RMS) value of the error function tends to be stable or unchanged, to obtain a final complex amplitude $_N E_O^f$ of the object light to be tested in the different modes; and (vii) after propagating $_N E_O^f$ to a surface or an image plane on which an object to be tested is located, divided by a complex amplitude of illumination light in the corresponding mode, to obtain a complex amplitude transmittance or reflectance function corresponding to the N-th mode of the object to be tested, completing iterative calculation.

5. A phase imaging device based on the wavefront modulation, comprising:

a light source module, wherein the light source module is a coherent light source (1), a light field beam splitting module, wherein the light field beam splitting module consists of a beam splitter (3), a first reflector (5), a first beam expander (4), and a second beam expander (6), a polarization control module, wherein the polarization control module consists of a second polarization film (9) and a third polarization film (10), a beam combining encoding module, wherein the beam combining encoding module achieves spatial overlap of an object light to be tested (25) and a wavefront modulated light (26) by controlling angles of the beam splitter (3) and the first reflector (5), a light spot detector (8), and a control and data processing module, wherein the control and data processing module is a computer (29), wherein the coherent light source (1) is divided into a transmitted light and a reflected light after passing through the beam splitter (3), the transmitted light passes through the second polarization film (9) and the first beam expander (4) sequentially and is incident on the light spot detector (8), and the reflected light passes through the first reflector (5), the second beam expander (6), and a sample to be tested (7) sequentially and reaches the light spot detector (8);

an emitted light of the first beam expander (4) is used as the wavefront modulated light (26), an emitted light of the second beam expander (6) is used as the object light to be tested (25), the light spot detector (8) simultaneously records an encoded light field intensity distribution map containing two polarization states and an intensity distribution map of the object light to be tested (25), and the light spot detector (8) is controlled by the computer (29).

6. A phase imaging device based on the wavefront modulation, comprising:

a light source module, wherein the light source module is composed of a first single-wavelength laser (17), a second single-wavelength laser (18), and an optical fiber beam combiner (19), and the light source module as a laser cluster comprises at least two single-wavelength lasers or a single laser containing a plurality of wavelengths, a light field beam splitting module, wherein the light field beam splitting module consists of an optical fiber beam splitter (12), an optical fiber collimator (13), a reflector lens (16), and a spherical reflector (20), a polarization control module, wherein the polarization control module is achieved by polarization parameters of the first single-wavelength laser (17), the second single-wavelength laser (18), and the optical fiber beam combiner (19), a beam combining encoding module, wherein the beam combining encoding module is achieved by controlling an emitting angle of the optical fiber collimator (13), a light spot detector (8), and a control and data processing module, wherein the control and data processing module is a computer (29), wherein an output light of the first single-wavelength laser (17) and the second single-wavelength laser (18) is beam-combined by the optical fiber beam combiner (19), and then divided into two beams by the optical fiber beam splitter (12), each beam contains lasers of both the first single-wavelength laser (17) and the second single-wavelength laser (18) at the same time, wherein one beam is collimated into parallel light or spherical wave by the optical fiber collimator (13) and reaches the light spot detector (8) as a wavefront modulated light (26), and the other beam as a point light source is collimated into parallel light or spherical wave by the reflector lens (16) and spherical reflector (20) as an illumination light of a reflection-type sample (14), the reflection-type sample (14) is a flat-surface, spherical-surface, free-form surface or irregular spherical surface structure, a reflected light of the reflection-type sample (14) is reflected by the spherical reflector (20), and then passes through the reflector lens (16) and reaches the light spot detector (8) as an object light to be tested (25), and the light spot detector (8) is controlled by the computer (29).

* * * * *